United States Patent [19]

Mathias et al.

[11] Patent Number: 5,441,339
[45] Date of Patent: Aug. 15, 1995

[54] VEHICLE LIGHT

[75] Inventors: Larry E. Mathias, Hudsonville; Jason M. Hathaway; Elisabet A. Anderson, both of Holland, all of Mich.

[73] Assignee: Prince Corporation, Holland, Mich.

[21] Appl. No.: 217,365

[22] Filed: Mar. 24, 1994

Related U.S. Application Data

[63] Continuation-in-part of Ser. No. 964,930, Oct. 22, 1992, Pat. No. 5,329,429.

[51] Int. Cl.$^6$ .............................................. B60Q 3/02
[52] U.S. Cl. ........................................ 362/74; 362/365
[58] Field of Search .................. 362/74, 364, 365, 404

[56] References Cited

U.S. PATENT DOCUMENTS

| | | |
|---|---|---|
| 324,111 | 2/1992 | Arbisi . |
| 3,321,731 | 5/1967 | Goldbaum ............................ 362/74 |
| 4,241,870 | 12/1980 | Marcus . |
| 4,584,631 | 4/1986 | Cody et al. . |
| 4,670,819 | 6/1987 | Boerema et al. . |
| 4,686,609 | 8/1987 | Dykstra et al. . |
| 4,739,224 | 4/1988 | Geerlings . |
| 4,824,159 | 4/1989 | Fluharty et al. . |
| 4,828,910 | 5/1989 | Haussing . |
| 4,909,470 | 3/1990 | Clark . |
| 4,941,071 | 7/1990 | Knauf ................................... 362/365 |
| 5,070,434 | 12/1991 | Suman et al. . |
| 5,239,449 | 8/1993 | Wnuk et al. ............................ 362/74 |

FOREIGN PATENT DOCUMENTS

| | | | |
|---|---|---|---|
| 1132016 | 6/1962 | Germany ............................... 362/74 |
| 3813349 | 6/1989 | Germany ............................... 362/74 |
| 2630060 | 10/1989 | Germany ............................... 362/74 |
| 0067135 | 4/1994 | Japan . |

OTHER PUBLICATIONS

Exhibit A (Attached hereto).

*Primary Examiner*—Richard A. Bertsch
*Assistant Examiner*—Roland G. McAndrews, Jr.
*Attorney, Agent, or Firm*—Price, Heneveld, Cooper, DeWitt & Litton

[57] ABSTRACT

A lamp assembly for a vehicle is integrally formed in a vehicle headliner which includes an aperture for receiving a lens. In some preferred embodiments, the lens snap-fits directly to the headliner. In another preferred embodiment the lens and a trim bezel interlockably engage the edge of the headliner.

5 Claims, 4 Drawing Sheets

VEHICLE LIGHT

CROSS REFERENCE TO RELATED APPLICATIONS

This application is a continuation-in-part of U.S. patent application Ser. No. 964,930 filed Oct. 22, 1992 and entitled Vehicle Light, now U.S. Pat. No. 5,329,429 the disclosure of which is incorporated herein by reference.

BACKGROUND OF THE INVENTION

The present invention relates to an auxiliary light for a vehicle such as an automobile.

Vehicles typically include a variety of interior lighting such as overhead dome lights, door panel lights to assist ingress and egress, map reading lights and the like. In the past, such lighting assemblies have frequently been manufactured by companies specializing in light assemblies who provide them to automotive manufacturers for subsequent assembly into a finished vehicle. Such assemblies have, accordingly, been self-contained and will typically include a lamp housing with a trim bezel and a removable lens for access to fasteners for securing tile housing to the vehicle support structure. Frequently, the lamp housing will also include a separate reflector for the bulb which adds another component to the lamp assembly. The resultant structure, although functioning well to providing illumination to the vehicle interior, is a complex, multi-component unit which is costly in terms of parts and material and also in terms of assembly labor and subsequent installation in the vehicle or a sub-component of the vehicle.

With the integration of vehicle parts such as door panels and headliners which are now frequently being supplied by a single manufacturer, the assembly of such prior art lamp structures is easier since they can be preassembled prior to the installation of the main vehicle panel into the vehicle during assembly. Nonetheless, the cost of such prior art assemblies and their assembly itself remains high.

SUMMARY OF THE PRESENT INVENTION

The lamp assembly of the present invention is integrated into a vehicle headliner which is formed to directly support a lens receiving structure such that the vehicle interior lamp includes a minimum number of components and therefore reduces both the cost of the structure as well as its assembly cost.

Apparatus embodying one aspect of the present invention includes a vehicle panel formed to define a concave lamp receiving area including at least a pair of lens receiving mounting slots around the periphery thereof. In a preferred embodiment, aperture means are formed in the panel near the center of the concave area for receiving a lamp assembly including a lamp, a lamp socket and a clip for attaching the socket to the panel. The lamp assembly further includes a lens having tab means which extend into the mounting slots formed in the panel for attaching the lens directly to the panel.

In another embodiment of the invention, the panel comprises a vehicle headliner with a centrally located lamp area which includes an aperture therein. A snap-in lens includes mounting tabs extending from the rim of the lens for engaging the edge of the headliner aperture such that the lens snaps directly to the vehicle headliner. The lens includes means integrally formed therein for supporting a lamp with respect to said lens for directing light through said lens.

In yet another embodiment of the present invention, the headliner includes aperture means for receiving a snap-in bezel and an interlocking lens.

With such construction, the typical lamp housing is eliminated, as are fasteners such as screws or the like. The resultant structure provides an inexpensive, attractive and modern appearing lamp assembly for use in a vehicle and one which can be integrated into a vehicle panel such as a headliner. These and other features, objects and advantages of the present invention will become apparent upon reading the following description thereof together with reference to the accompanying drawings in which:

DETAILED DESCRIPTION OF THE PREFERRED EMBODIMENT

Figure 1:
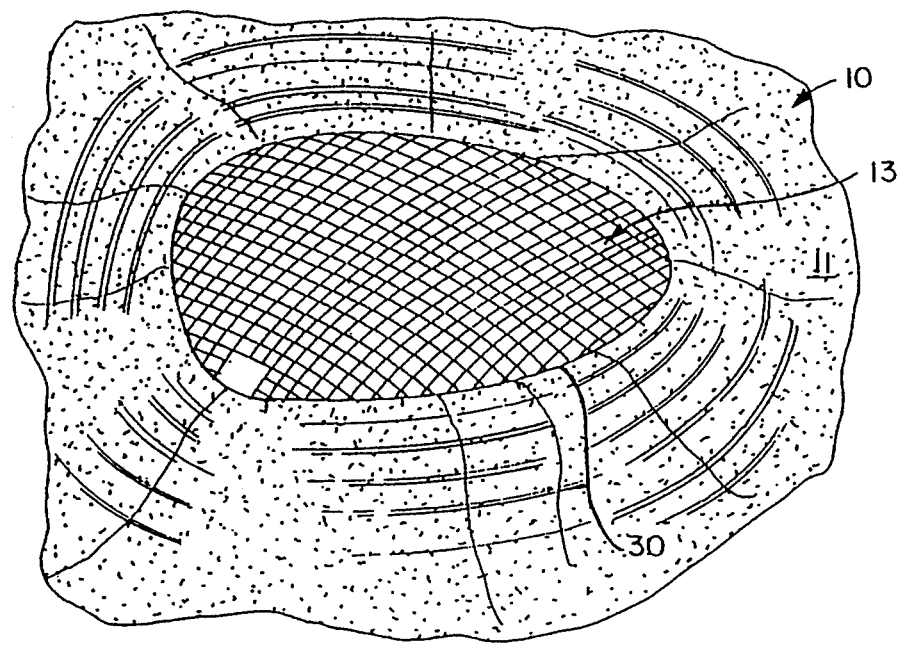
FIG. 1 is fragmentary, perspective view of a vehicle headliner including a lamp assembly embodying the present invention.
Figure 2:
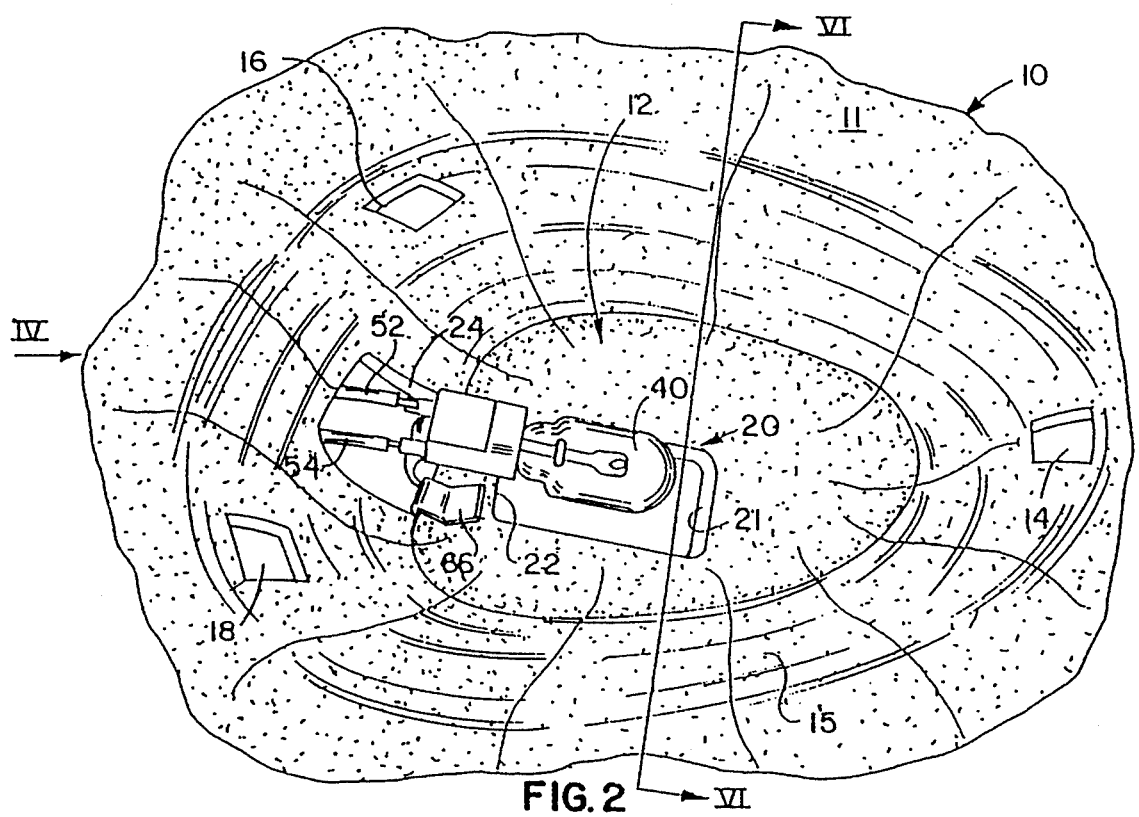
FIG. 2 is an enlarged view of the structure shown in FIG. 1 shown with the lens removed.

Referring initially to FIGS. 1 and 2, there is shown a headliner 10 for a vehicle such as an automobile or the like. The headliner 10 is a relatively thin, generally three-dimensional preformed panel shaped to fit within a particular vehicle body. Headliners are manufactured of a variety of composite materials frequently utilizing a molded resin impregnated fibrous bat material having an upholstered surface 11 facing the vehicle interior on one side. The opposite side 13 (FIGS. 3 and 4) is unfinished inasmuch as it is unexposed upon assembly. Any variety of commercially available methods, materials and systems are employed for molding headliner shapes in a variety of configurations with one such system disclosed in U.S. Pat. No. 4,828,910 issued May 9, 1989, and entitled SOUND ABSORBING LAMINATE, the disclosure of which is incorporated herein by reference.

The panel 10, although a headliner in the preferred embodiment may also take the form of other vehicle panels such as a door panel which also can integrally include the present invention.

Figure 3:
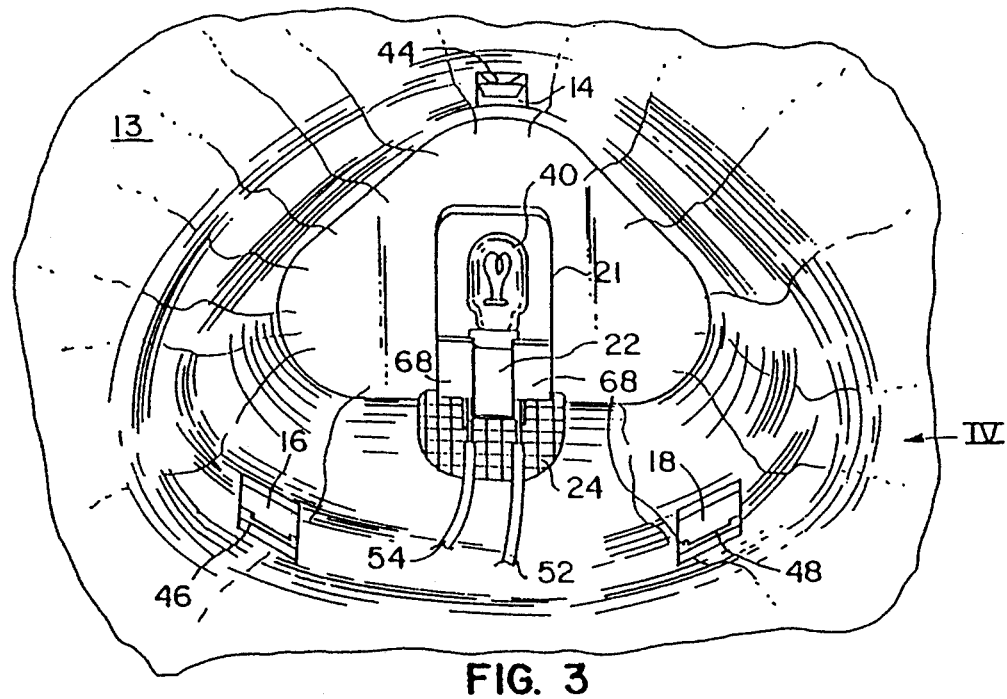
FIG. 3 is a underside view of the lamp assembly embodying the present invention taken in the direction indicated by Arrow III in FIG. 2, but from the opposite side of the panel.
Figure 4:
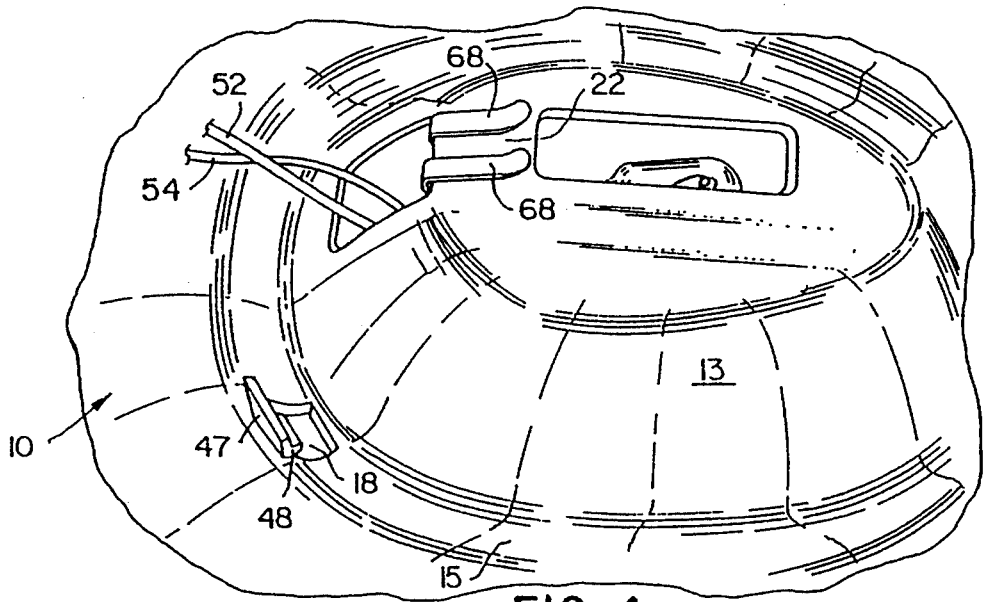
FIG. 4 is an enlarged, fragmentary, perspective view of the structure shown in FIG. 3, taken in the direction indicated by Arrow IV in FIG. 3.
Figure 6:
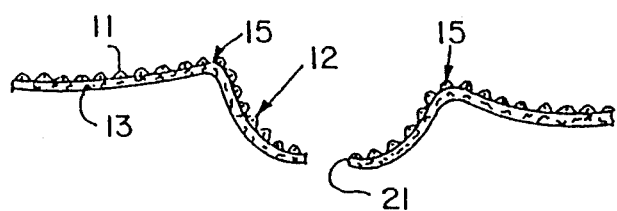
FIG. 6 is a cross-sectional view taken along section line VI-VI of FIG. 2.

Referring now to FIGS. 2-4, the headliner 10 includes a concave depression or recess 12 formed therein which is from a side facing the upholstered side 11. Thus, in FIGS. 3 and 4, the concave recess 12 appears as a convex bulge. The recess 12 is integrally formed and molded with the headliner 10. Three generally equally spaced mounting slots 14, 16 and 18 are formed in the panel and located generally around the periphery of the concave recess 12 which is offset toward the interior of the vehicle in a preferred embodiment of the invention by a convex rim 15 (FIG. 6). Convex rim 15 surrounds the periphery of recess 12 and includes the mounting slots 14, 16, and 18. Recess 12 and surrounding rim 15 are generally rounded triangular in shape as best seen in FIGS. 2 and 3.

At the bottom of recess 12 there is formed aperture means 20 including a first generally rectangular aperture 21 aligned immediately behind a lamp 40 and a second generally rectangular aperture 24 formed in the curved side of recess 12 with a bridging member 22 extending between apertures 21 and 24 for receiving a bulb socket clip 60 as described below.

As seen in FIGS. 1 and 3, the lamp assembly includes a lens 30 which also has a generally rounded triangular shape with a light directing grid pattern formed on the interior surface thereof in a conventional manner for directing illumination from lamp 40 to the vehicle interior as desired. Lens 30 can be molded from a suitable material such as clear polycarbonate and includes three mounting tabs 44, 46 and 48 at the apices of the generally triangular lens which snap-lock within apertures 14, 16 and 18 of the headliner 10 as best seen in FIGS. 3 and 4. For such purpose, each of the tabs include an arrowhead-shaped end 47 as best seen in FIG. 4 in connection with tab 48 which overlies the edge of the associated slot such as slot 18 shown in detail in this Figure.

Figure 5:
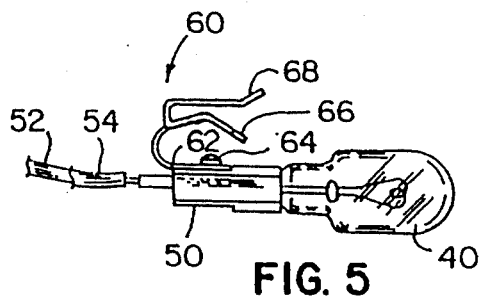
FIG. 5 is an enlarged, side elevational view of a portion of the structure shown in FIGS. 2-4.

In a preferred embodiment, the convex rim or peripheral rim 15 of the recess 12 is formed to extend downwardly somewhat from the plane of the headliner 10 as best seen in FIGS. 3 and 4 such that the lens 30 extends slightly below the adjacent surface of the headliner to provide additional clearance for the bulb 40. Bulb 40 is mounted in a conventional bulb socket 50 which is best seen in FIG. 5 and which includes a pair of conductors 52 and 54 extending therefrom for supplying electrical operating current to the bulb 40. For such purpose, conductors 52 and 54 are coupled to the vehicle's electrical system which may include conductors which are integrally mounted to the headliner assembly. A spring clip 60 attaches the socket 50 to the bridge 22 of the assembly as best seen in FIGS. 2-4.

Clip 60 includes a first leg 62 which is secured to socket 50 by means of a suitable fastener 64 such as a rivet or the like and an upwardly curved, generally C-shaped first pair of bifurcated lower arms 66 which extend on the upper surface 11 of the bridge member 22 formed at the bottom of recess 12 as best seen in FIG. 2. Spring clip 60 further integrally includes a pair of bifurcated upper arms 68 which, as best seen in FIGS. 3 and 4, compressibly grip the upper surface 13 of recess 12 and particularly the bridge section 22 thereof for holding the lamp socket 50 and bulb 40 therein in centered relationship to aperture 21 and spaced from the lowermost floor of recess 12 to provide clearance and heat dissipation for bulb 40. Bulb 40 may be a five candle power or other suitable sized bulb for use in vehicle interior lighting. Aperture 24 provides, as best seen in FIGS. 2-4, clearance for the assembly of clip 60 with legs 66 and 68 compressibly engaging bridge 22 and conductors 52 and 54 extending outwardly through the aperture formed in the sidewall of recess 12.

Installation of the lamp assembly to the headliner is easily accomplished by sliding clip 60 over bridge 22 and the subsequent snap-fitting of lens 30 into the mounting slot of the preformed headliner. Thus, the lamp assembly of the present invention provides an extremely modern, streamlined assembly as best seen in FIG. 1 and one which utilizes a minimum of parts and labor for its manufacture. The recess 12 can take on a variety of configurations including a round recess for receiving a round lens.

Figure 7:
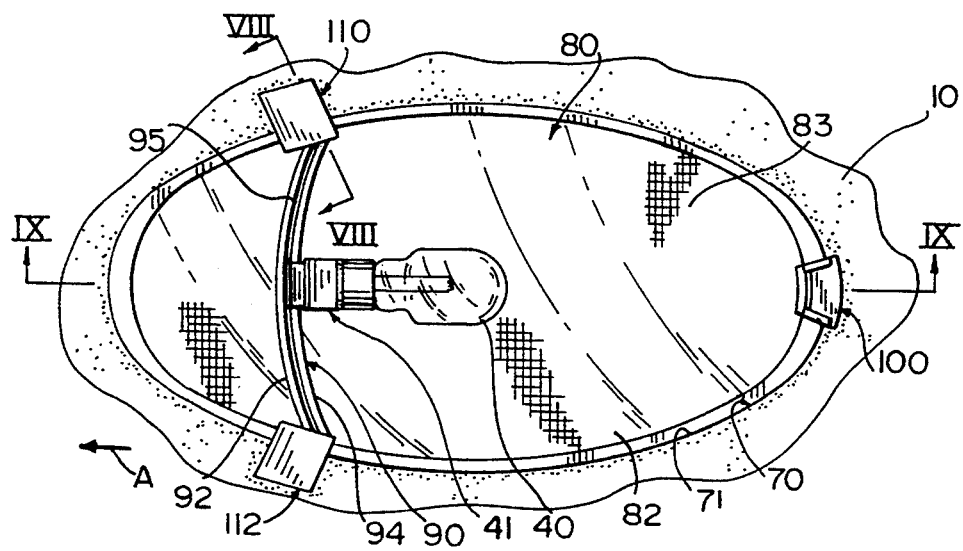
FIG. 7 is a fragmentary top plan view of an alternative embodiment of the present invention as viewed from the roof side of the vehicle.
Figure 8:
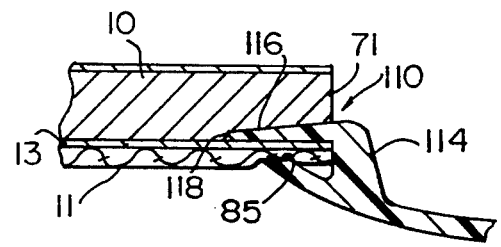
FIG. 8 is an enlarged cross-sectional view taken along section lines VIII—VIII of FIG. 7.
Figure 9:
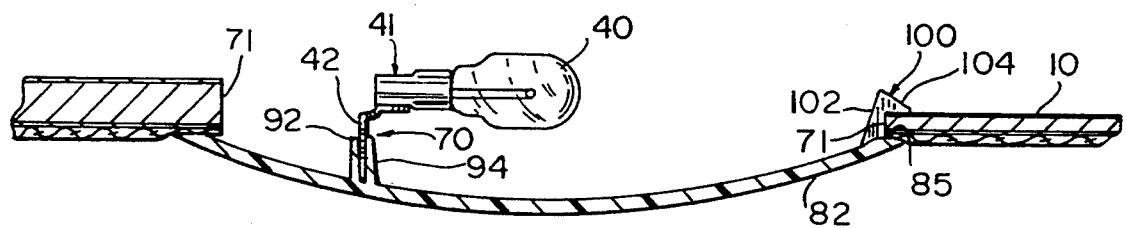
FIG. 9 is a cross-sectional view of the assembly shown in FIG. 7 taken along section lines IX—IX on FIG. 7.

Referring now to the embodiment shown in FIGS. 7-9, the headliner 10 of a vehicle is shown in FIG. 7 from the top (i.e. roof side) and includes an oval aperture 70 defining an edge 71 for directly receiving a lens and lamp assembly 80. Assembly 80 includes a lens 82 which can be integrally molded of a clear polycarbonate material having a textured inner surface 83 (FIG. 7) for diffusing light from lamp 40 which can be the same type of lamp shown in the earlier embodiment with the exception of the mounting of lamp socket 41 to an integral lens socket 90 extending across opposite sides of the oval shaped lens 82. Lens socket 90, as best seen in FIGS. 7 and 9, is integral with lens 80 and includes spaced vertical walls 92 and 94 defining a gap 95 therebetween for receiving one leg 42 of a lamp mounting socket 41 which extends downwardly into slot 95 and is frictionally held therein to position lamp 40 generally in centered alignment with the middle of lens 82 as best seen in FIGS. 7 and 9.

Lens 82 also integrally includes snap fasteners which allow the snap-fit connection of lens 82 to the peripheral oval edge 71 of headliner aperture 70. The snap-in fastening structure of lens 80 includes a forward tab 100 with an upwardly extending leg 102 and an outwardly extending triangular tip 104 which overlies the headliner 10 as best seen in FIG. 9. The top surface of tip 104 is bevelled to allow tab 100 to snap over edge 71 during installation as described below. Lens 82 also includes a pair of rear fasteners 110 and 112 which are of identical construction with only fastener 110 described in detail in connection with FIG. 8. Fastener 110 comprises an upwardly extending leg 114 with an outwardly projecting leg 116 which overlies the peripheral surface 85 of the oval lens 82. The horizontally extending leg 116 has a pointed tip 118 allowing fastener 110 (and similar fastener 112) to be pushed into the headliner substrate 10 with the outer fabric 11 lying adjacent surface 85 of the lens and leg 116 embedded within the headliner substrate 10 which may be made of a foam polymeric material, compressed resinous fibers, or other conventional material which allows the penetration by leg 116. The spacing between the lower surface of leg 116 and upper peripheral surface 85 of the peripheral lip of lens 82 can be varied if desired such that fasteners 110 and 112 engage the substrate 10 in a suitable fashion however it has been discovered that engaging the fabric surface 11 on one side and a scrim layer 13 forming an integral part of the headliner substrate 10, on the other side is preferable. In a preferred embodiment, surface 85 extends continuously around lens 82 to engage surface 11 of the headliner.

Installation of the lamp assembly 80 including lens 82 and integral lamp 40 and socket 41, which is coupled to the vehicle's electrical system in a conventional manner is achieved by sliding the lens assembly rearwardly in a direction indicated by arrow A in FIG. 7 while the front is inclined downwardly until fasteners 110 and 112 engage the headliner as shown in FIG. 8. Subsequently the forward fastener 100 is pushed upwardly until the tapered top surface of tab 104 snaps over the headliner 10 with the upper facing peripheral surface 85 of the lens engaging the fabric as best seen in FIG. 9 to complete the installation.

Figure 10:
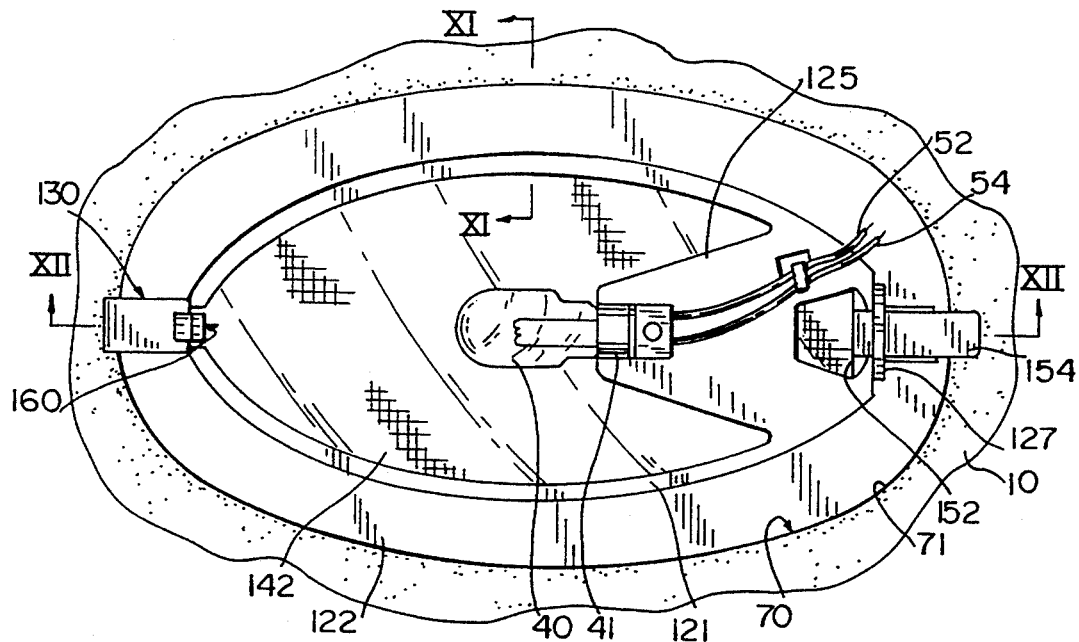
FIG. 10 is a fragmentary top plan view of yet another embodiment of the present invention as viewed from the roof side of the vehicle.
Figure 11:
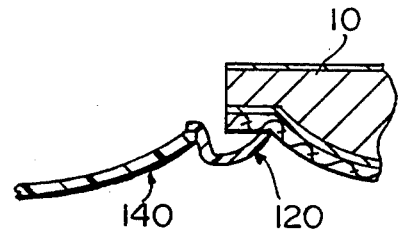
FIG. 11 is an enlarged cross-sectional view taken along section lines XI—XI of FIG. 10.
Figure 12:
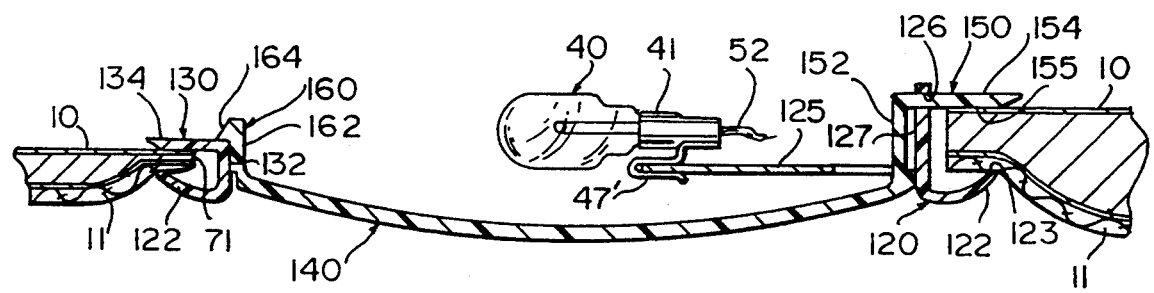
FIG. 12 is a cross-sectional view of the structure shown in FIG. 10 taken along section lines XII—XII of FIG. 10.

In yet another embodiment of the invention shown in FIGS. 10–12, an interlocking bezel and lens combination is provided. As seen in FIGS. 10 and 12, an oval bezel 120 is provided which is defined by a vertical collar having a lower outer peripheral flange or lip 122 which extends around the periphery of the bezel and engages the fabric surface 11 of headliner 10 around the entire periphery of the oval opening 70 also provided in the headliner as in the previous embodiment. The bezel is integrally molded of a polymeric material such as polycarbonate and includes a fastener 130 at its rearward end which is integral with flange 122 and defines a C-shaped clamp by providing a vertical leg 132 and a horizontally extending leg 134 which overlies the top of headliner 10 and compressibly engages the headliner in conjunction with the flange 122. For such purpose, bezel 120 is made of a resilient polymeric material allowing the compressive engagement by fastener 120 to the headliner.

A lamp assembly 40 is coupled to a bridge section 125 of bezel 120 using a compressible clamp 47′ associated with lamp socket 41 to position lamp 40 in alignment with and is spaced in relationship to lens 140 which also is generally oval and inter-engages and interlocks with bezel 120 as best seen and described in connection with FIGS. 10 and 12.

Lens 140, like the previous lenses, is integrally molded of a clear polycarbonate material having a textured inner surface 142 for providing diffuse light from lamp 40. Lens 140 includes a forward fastener 150 defined by an upwardly extending vertical leg 152 with a forwardly horizontally extending leg or flange 154 which extends through a slot 126 formed in a forward vertical leg 127 of bezel 120. This connection not only attaches the forward end of the oval lens 140 to the bezel 120 but simultaneously compressibly holds the bezel and lens combination to the headliner 10 as best seen in FIG. 12. Thus, the lower of surface 155 of leg 154 engages the upper surface of the headliner 10 while the tip 123 of bezel flange 122 engages the upholstery material 11 of the headliner.

The opposite end of lens 140 includes a snap-over tab fastener 160 having a vertical leg 162 terminating in a horizontally outwardly projecting tab 164 which snap-fits over the leg 134 of bezel fastener 130 holding the opposite end of lens 140 to bezel 120.

For installation, bezel 120 is first compressibly attached to the edge 71 of aperture 70 by fastener 130 at its rear end. Subsequently lens 140 has leg 154 of fastener 150 extended through slot 126 in the forward leg 127 of bezel 120 with bezel 120 held in its installed position such that leg 154 and bezel flange 122 compressibly engage the edge of the headliner. Next the rear fastener 160 of lens 140 is pushed upwardly such that rear fastener 160 snaps into place over fastener 130 of the bezel to complete the installation. Power for lamp 40 is also supplied to the lamp conventionally by suitable conductors 52 and 54 as in the previous embodiments.

It will become apparent to those skilled in the are that various modifications to the preferred embodiments of this invention can be made without departing from the spirit or scope thereof as defined by the appended claims.

The embodiments of the invention in which an exclusive property or privilege is claimed are defined as follows:

1. A lamp assembly for a vehicle headliner comprising:
    a vehicle headliner including a lens aperture defining an edge;
    a lamp socket; and
    a lens including a peripheral surface for engaging an exposed side of said headliner and a first fastener which includes a tab with an inclined surface forming an acute angle which allows said first fastener to snap into place over said edge of said aperture and at least a second fastener spaced from said first fastener which includes a leg spaced from said peripheral surface of said lens to engage at least a portion of said headliner between said leg and said peripheral surface of said lens, said lens including a slot for receiving said lamp socket therein to mount said lamp socket directly to said lens.

2. A lamp assembly for a vehicle headliner comprising:
    a vehicle headliner including a lens aperture defining an edge; and
    a lens including a peripheral surface for engaging an exposed side of said headliner and a first fastener which includes a tab with an inclined surface which allows said one fastener to snap into place over said edge of said aperture and at least a second fastener spaced from said first fastener which includes a leg extending in spaced parallel relationship from said peripheral surface of said lens to engage at least a portion of said headliner between said leg and said peripheral surface of said lens, wherein said leg includes a pointed tip to allow said leg to penetrate said edge of said headliner.

3. The lamp assembly as defined in claim 2 wherein said peripheral surface extends continuously around said lens.

4. The lamp assembly as defined in claim 3 wherein said lens is generally oval.

5. The lamp assembly as defined in claim 4 wherein said lens is convex as viewed from said exposed side of said headliner.

* * * * *